(12) United States Patent
Zalduegui

(10) Patent No.: US 11,845,123 B2
(45) Date of Patent: Dec. 19, 2023

(54) SYSTEMS AND PROCESSES FOR MANUFACTURING NESTED COMPONENTS

(71) Applicant: Focal Point, LLC, Chicago, IL (US)

(72) Inventor: Ibon Rementeria Zalduegui, Chicago, IL (US)

(73) Assignee: Focal Point, LLC, Chicago, IL (US)

( * ) Notice: Subject to any disclaimer, the term of this patent is extended or adjusted under 35 U.S.C. 154(b) by 367 days.

(21) Appl. No.: 17/161,776

(22) Filed: Jan. 29, 2021

(65) Prior Publication Data

US 2021/0146423 A1    May 20, 2021

Related U.S. Application Data

(62) Division of application No. 16/195,416, filed on Nov. 19, 2018, now Pat. No. 11,045,858.

(51) Int. Cl.
*B21D 28/06* (2006.01)
*B21D 28/10* (2006.01)
*B21D 3/00* (2006.01)
*B23P 13/02* (2006.01)
*B21D 11/08* (2006.01)
*B23K 26/38* (2014.01)
(Continued)

(52) U.S. Cl.
CPC ............. *B21D 28/26* (2013.01); *B21D 28/06* (2013.01); *B21D 28/10* (2013.01); *B21D 35/001* (2013.01); *B23P 13/02* (2013.01)

(58) Field of Classification Search
CPC .......... B21D 5/02; B21D 5/16; B21D 31/005; B21D 35/001; B21D 35/003; B21D 21/00; B21D 28/06; B21D 28/10; B21D 28/24; B21D 28/26; B21D 28/265; B23P 13/00; B23P 13/02; B23P 13/04; Y10T 29/49789; Y10T 29/4979; B26D 7/18
See application file for complete search history.

(56) References Cited

U.S. PATENT DOCUMENTS 3,852,870 A * 12/1974 Elliott ................... B21D 53/00
                                                           428/596
2013/0225345 A1* 8/2013 Bodensteiner .......... F16G 13/06
                                                            59/35.1

FOREIGN PATENT DOCUMENTS

DE    102015105246 A1    10/2016
JP    H0999327 A          4/1997
(Continued)

OTHER PUBLICATIONS

English translate (JP2013230490A), retrieved date Mar. 13, 2023.*

*Primary Examiner* — Matthew Katcoff
*Assistant Examiner* — Mohammed S. Alawadi
(74) *Attorney, Agent, or Firm* — Greenberg Traurig, LLP

(57) ABSTRACT

A system for efficiently forming a plurality of shaped piece parts from a sheet of material comprises a sheet of piece part material from which the piece parts can be shaped and cut, a pattern for arranging the plurality of piece parts in a prearranged orientation, a series of joints connecting aligned ones of the piece parts within the pattern, a piece part cutting machine configured to separate a plurality of workpieces from the sheet of material according to the patterns and joints, a bending machine for simultaneously applying a first fold and a second fold, each across a respective set of aligned piece parts without breaking the series of joints, and a detacher for breaking the series of joints to groups and individual ones of joined piece parts.

12 Claims, 11 Drawing Sheets

(51) Int. Cl.
*B21D 28/26* (2006.01)
*B21D 35/00* (2006.01)

(56) References Cited

FOREIGN PATENT DOCUMENTS

| | | | |
|---|---|---|---|
| JP | 2006315060 A | | 11/2006 |
| JP | 2013230490 A | * | 11/2013 |
| JP | 2013230490 A | | 11/2013 |
| JP | 5550621 B2 | | 7/2014 |

* cited by examiner

SYSTEMS AND PROCESSES FOR MANUFACTURING NESTED COMPONENTS

CROSS-REFERENCE TO RELATED APPLICATION

This application claims priority to and is a divisional of U.S. patent application Ser. No. 16/195,416, filed Nov. 19, 2018, the entirety of which is incorporated herein by reference.

FIELD OF THE INVENTION

The present invention relates to the field of piece part manufacturing, and, in particular, to techniques and processes for designing and producing a large number of bent or folded nested components from sheet metal, in a highly efficient manner.

BACKGROUND OF THE INVENTION

The present invention relates to the design and manufacture of shaped, three-dimensional component parts from a sheet of material, such as metal. A well-known manufacturing process for bent components involves initially forming a two-dimensional shape from a sheet of metal—typically via laser cutting, punching, milling, or another suitable cutting process. Then, an operator carefully positions and aligns the unbent workpiece into a die situated as part of a press brake, and engages a punch that applies a force against the workpiece, forming a bend in the workpiece as it conforms to the shape of the die. The character of the bend formed in the workpiece may depend on the type of punch and die used. Commonly, this process forms one bent workpiece for each press brake operation, and is repeated to form the requisite number of bent, shaped workpieces.

Forming unbent workpieces out of sheet metal often results in wasted or "sacrificial" sheet metal. Some prior art approaches to reducing the waste of material and reducing the number of steps for simultaneously forming a plurality of shaped, bent piece parts have involved "stacking" the parts for a simultaneous die operation. Some other, more effective prior art techniques, sometimes referred to as "nesting," attempt to reduce this waste by arranging the workpiece cut lines into a grid or by otherwise arranging them so as to minimize the amount of sacrificial material. Recent computerized innovations have attempted to automate this process, in which a set of shapes are algorithmically arranged and optimized according to a set of heuristics (e.g., a percentage of space occupied by cut shapes relative to the size of the sheet of material). The goal of these prior art techniques is generally to fit as many components on a single sheet as possible.

Another known technique involves designing the shape of the components themselves in a way that allows for "line merging"—where a single cut simultaneously forms the edges of two or more components. A simple example of line merging might involve arranging one square immediately adjacent to another square on a sheet of material, such that the two squares share a common side. A cutting machine can then cut that shared side in single pass, forming the respective edges of both squares using a single cut path.

In each of these known sheet metal component layout techniques, the workpiece is completely decoupled from the sheet of metal. An operator would then collect the separated workpieces, and bend each of them in a press brake—one at a time—to introduce bends or folds into the workpieces. While the amount of wasted material can be reduced using these techniques, the press brake operation is still performed manually on each component.

Amongst the prior art, some processes leverage the benefits of computer numerical control (CNC) machines to automate the process of forming each of the workpieces. One known process involves initially cutting out "blanks"—or unbent workpieces—from a sheet of metal, transporting the blanks to a CNC bending machine, and executing a program on the bending machine that bends each piece in series supplied thereto via a conveyor belt—it does so, one at a time. While this process reduces the extent of human intervention in the manufacturing process, it still requires the sequential formation of each bent workpiece through a series of separate bending operations.

Some other techniques disclosed in the prior art enable workpieces to maintain a mechanical connection to the sheet metal, while still being substantially cut out from the sheet metal. One technique known in the art involves cutting a substantial amount of a workpiece out of a sheet of metal, and stamping or punching creases into the uncut portions—making those portions weak and capable of being separated from the sheet metal without the need for strong separation machinery. More recently, high precision CNC laser cutters have enabled the formation of "microjoints" or "nanojoints," in which a small gap in a cut line leaves a small bridge of material spanning from the sheet to the substantially-cut workpiece. Designing the cut lines to include such microjoints allow components to remain rigidly connected to each other and/or the sheet metal, for subsequent processing.

One prior art process has proposed the concept of placing identical components, held together by microjoints, directly adjacent to each other and aligned, such that a single bend line extends across multiple components. The microjointed array of piece parts are supplied to a press brake, whereby one bend operation forms a fold across multiple components. This prior art process, however, does not disclose or contemplate the formation of complex three-dimensional shapes that include more than one fold or bend therein. Rather, the disclosed process, in effect, involves placing multiple identically arranged, aligned, and oriented unbent piece parts into a press brake, and subsequently separating the bent piece parts. Relatively few parts are adaptable to this process when a plurality of folds is required, especially when the shape of the piece part itself is intricate, complex, or asymmetric with respect to itself.

It is therefore an object of the present invention to provide systems and processes for designing and forming more complex bent piece parts that could not otherwise be formed using the techniques disclosed in the prior art, while simultaneously benefitting from the efficiencies gained by component nesting initially in a continuous plane, and by reducing the number of bending operations involved in forming a large number of components.

These and other objectives and advantages will become apparent from the following detailed written description and figures.

SUMMARY OF THE INVENTION

To accomplish the aforementioned objectives, embodiments of the present invention provide for systems and processes that significantly improve the efficiency in the manufacture of three-dimensional component parts formed from a flat sheet of material. In one example, a CNC laser cutter or the like is programmed, or otherwise controlled, to form a series of cuts in sheet metal or other material to substantially form the edges of a plurality of contiguous workpieces. At the interface between two adjacent workpieces, line merging is used to enable a cut path to simultaneously form a portion of the edges of the two adjacent workpieces. This cut path may be non-continuous, leaving a small bridge of material—or "microjoint"—that prevents the two adjacent workpieces from being completely separated and rigidly decoupled from one another. After the cutting operation is complete, at least one microjoint may remain between each adjacent workpiece substantially formed in the sheet metal or other material, such that the predominantly cut workpieces each remain rigidly fixed with respect to each other, until easily broken apart after formation has been completed.

With the workpieces substantially cut from the sheet of metal or other material, the cut but unbent sheet is then provided to a press brake or bending machine. The workpieces—still connected to the sheet of material by way of the microjoints or otherwise, such as by spot weld or adhesive, to form a collective of piece parts still joined in a single sheet—may be aligned such that a single, long bend line spans across multiple aligned workpieces. In this manner, each press brake operation, or single stroke of a punch into a corresponding die, imparts a bend or fold into multiple workpieces simultaneously. For a large sheet containing dozens, or even hundreds, of substantially cut workpieces, all of the workpieces may be bent in just a few press brake operations.

The predominantly cut and bent workpieces, still affixed to each other by way of the microjoints, or otherwise, can then separated from each other without the need for substantial machinery or tools. In some cases, the microjoints can be broken apart by hand, allowing the dozens or hundreds of workpieces to be separated from each other quickly, easily, and safely, with only minimal force. The microjoints may also be severed by other processes—manual, automated, or otherwise. Regardless of the particular separation technique employed, this technique of the present invention obviates the need for substantial post-processing—such as laser cutters, punches, or specialized tools—while significantly reducing the time involved between the bending operation and the separation of each bent workpiece from the sheet of material and other workpieces. Alternatively, the still attached, but bent and shaped piece parts can each be separated from the other via a simple stroke or an automated "separation" platen.

Some modern bending machines are operable via CNC, and can therefore be programmed to impart multiple bends, at specified angles and locations, into a large sheet of material. Using the techniques of the present invention, hundreds of workpieces that are aligned in a grid or nested with adjacent like workpieces can be bent in a sequence of programmed bending operations—thereby allowing hundreds of workpieces to be simultaneously formed in a matter of seconds. In this manner, component parts, such as metal brackets, can be formed in a fraction of the time compared to conventional press brake formation techniques.

Examples of the present disclosure extend this technique further by providing a design process that, when followed, enables the formation of more complex three-dimensional shapes. The design process involves first determining whether a particular component part, in its unbent form, can be aligned and/or nested such that a common bend line extends across multiple components, regardless of which component feature is to be formed by the common bend line. Once the parts are arranged and/or nested, the next step is to designate the microjoint locations. With each bend forming a different "surface" or "plane," a set of microjoints on the same plane are substantially aligned, such that a straight line could be drawn through all of the microjoints on that plane. If a first workpiece is directly adjacent to more than one workpiece, such as a second workpiece and a third workpiece, (or a sacrificial portion of the sheet of material), and the interface between the first and second workpieces is on a different "plane" than the interface between the first and third workpieces after bending has occurred, then the microjoint connecting the first and second workpieces is placed at or near a maximum possible distance (or at a distance greater than a threshold minimum distance) from the microjoint connecting the first and third workpieces. Preferably, the condition or rule for substantially linearly aligning microjoints on the same plane, and the condition or rule for placing microjoints connected to a particular workpiece on different planes far apart from each other, are both adhered to or otherwise balanced.

Without applying this microjoint placement process, the collection of microjoints would form strong triangular structures, considerably increasing the difficulty in separating the bent workpieces from each other, after piece part formation, possibly requiring the use of special tools or subjecting the bent workpieces to damage due to the excessive force involved in breaking apart the strong "lattice" of microjoints. Specific examples of the microjoint placement technique are shown and described in the present application in greater detail below.

The present invention further contemplates the application of the workpiece layout and microjoint placement techniques to evaluate an existing catalogue of component parts. An individual component—represented in data as an engineering or computer aided design (CAD) drawing—might be formed by introducing one or more folds into a flat sheet or "blank." The component, on its own, may possess a set of characteristics relevant to determining its eligibility to be nested and "microjointed" in a sheet of material, bent, and separated thereafter. For example, if all bend lines of the component in question are each in parallel, each span across the entire part, and each individual bend line produces one or more folds in the same bending direction (hereinafter bend line "coherence"), then the manufacture of that eligible component could become significantly more efficient using the techniques of the present disclosure. Embodiments of the present disclosure may involve assessing a component for eligibility in the nested component manufacturing process of the present invention, and/or the most efficient format for orientation.

According to a first aspect of the present invention, there is provided a method of forming a plurality of shaped piece parts from a substantially flat sheet of material. The method involves arranging a plurality of aligned workpieces into an optimized workpiece pattern, and arranging one or more series of joints that maintains the workpieces in rigid connection and alignment relative to each other. The series of joints include a particular joint, or a particular set of joints, which has or shares a common axis of rotation to permit a first section of the plurality of workpieces to be rigidly decoupled from a second section of the plurality of workpieces through a single rotation of the first section about the common axis of rotation with respect to the second section, thereby breaking an aligned series of said joints. The method also involves integrating, or forming, the optimized workpiece pattern into the substantially flat sheet of material. The method further involves applying one or more folds across the sheet of material, where each fold forms a respective plurality of aligned bends in at least some of the plurality of workpieces. Additionally, the method involves breaking the series of joints to rigidly decouple each of the workpieces into individual shaped piece parts.

In some embodiments according to the first aspect, the integration of the optimized workpiece pattern involves, at least in part, the storage and organization of data and/or instructions representative of the arranged, aligned, and orientated workpieces, together with the series of joints. Such data and/or instructions may then be supplied to cutting machines, bending machines, and/or other computer-controlled manufacturing machines to cut or otherwise form the workpieces in a sheet of material, and to provide the joints as microjoints, welds, brazing, adhesive, and/or any other joining technique.

In some embodiments according to the first aspect, arranging the plurality of workpieces into the optimized workpiece pattern involves arranging a first set of the plurality of workpieces in an interlaced opposite orientation with respect to a second set of the plurality of workpieces. The interlaced opposite orientation may interleave the first set of workpieces with the second set of workpieces, such that each workpiece of the first set is immediately adjacent to a workpiece of the second set, and vice versa. When the method involves applying at least two folds, a first fold and a second fold, across the sheet of material, the first fold may form a first plurality of bends in the plurality of workpieces and a second fold forms a second plurality of bends in the plurality of workpieces. More particularly, the first plurality of bends in the first set of workpieces corresponds to the second plurality of bends in the second set of workpieces, and the second plurality of bends in the first set of workpieces corresponds to the first plurality of bends in the second set of workpieces. Thus, one folding operation may impart different bends on different workpieces simultaneously. In cases where the first set of workpieces are each reflectionally symmetric with respect to the second set of workpieces, the combination of the first and second folds forms shaped piece parts such that the first set of workpieces is effectively interchangeable with the second set of workpieces.

In some embodiments according to the first aspect, each of the plurality of workpieces is asymmetric with respect to itself. In some cases, this asymmetry may be a lack of symmetry across a bend line, or across some other axis extending through the workpieces.

In some embodiments according to the first aspect, the breaking of one or more of the series of joints to rigidly decouple each of the workpieces into separate piece parts may involve multiple detachment steps or stages. For example, the method may further involve breaking the particular joint, or the particular set of joints, by rotating the first section of workpieces about the common axis of rotation with respect to the second section of workpieces, to thereby separate the workpieces into two or more decoupled groups. The method may then involve breaking the remaining joints that rigidly couple the workpieces in each of the decoupled groups, to separate each bent workpiece into an individual shaped piece part.

In some embodiments according to the first aspect, the material is sheet metal. The sheet metal may be any suitable type of sheet metal, including aluminium, steel, cold rolled steel, and galvanized steel, amongst others.

According to a second aspect of the present invention, there is provided a system for efficiently forming a plurality of shaped piece parts from a substantially flat sheet of material. The system includes a sheet of piece part material from which the piece parts can be shaped and cut. The system also includes a pattern for arranging the plurality of piece parts in alignment, and according to a prearranged orientation, onto the sheet of piece part material. The system, or the pattern itself, may also include a series of joints connecting aligned ones of piece parts within said pattern. The system further includes a piece part cutting machine configured to substantially separate a plurality of workpieces from the sheet of material according to the patterns and joints. The piece part cutting machine, or some other mechanism—by way of joints, an adhesive, or otherwise—maintains the plurality of workpieces in the prearranged pattern orientation and/or positions the joints to rigidly couple each of the plurality of piece parts in succession. Additionally, the system includes a bending machine for simultaneously applying a first fold, and subsequently a second fold, each across a respective set of aligned piece parts, without breaking the series of joints, to thereby form a plurality of shaped piece parts. The plurality of shaped piece parts remain rigidly connected in the prearranged orientation by way of the series of joints. Furthermore, the system includes a detacher for breaking said series of joints to groups and individual ones of joined piece parts.

In some embodiments according to the second aspect, the detacher is a human operator. In other embodiments according to the second aspect, the detacher is a machine, such as a platen, that applies one or more forces or torques to the rigidly connected and shaped piece parts, which breaks the joints and separates the parts into piece parts.

In some embodiments according to the second aspect, the cutting machine creates the series of joints to include one or more particular joints that have an axis of rotation to permit a first section of the plurality of shaped piece parts to be rigidly decoupled from a second section of the plurality of shaped piece parts through a single aligned rotation of the first section about the axis of rotation with respect to the second section.

In some embodiments according to the second aspect, the cutting machine substantially separates the plurality of piece parts from the sheet of metal by cutting along paths defined by said prearranged orientation of said pattern, said paths being non-continuous at a series of locations corresponding to positions of said series of joints, such that the cutting machine leaves uncut portions of said sheet of material as microjoints. In other embodiments, the cutting machine provides the series of joints by welding. In yet further embodiments, the cutting machine provides the series of joints by applying an adhesive.

The foregoing summary is illustrative only and is not intended to be in any way limiting. In addition to the illustrative aspects, embodiments, and features described above, further aspects embodiments, and features will become apparent by reference to the figures and the following detailed description and the accompanying drawings.

BRIEF DESCRIPTION OF THE DRAWINGS

For a better understanding of the invention, and to show how the same may be carried into effect, there will now be described by way of example only, specific embodiments, methods and processes according to the present invention with reference to the accompanying drawings in which.

DETAILED DESCRIPTION OF THE EMBODIMENTS

Figure 1:
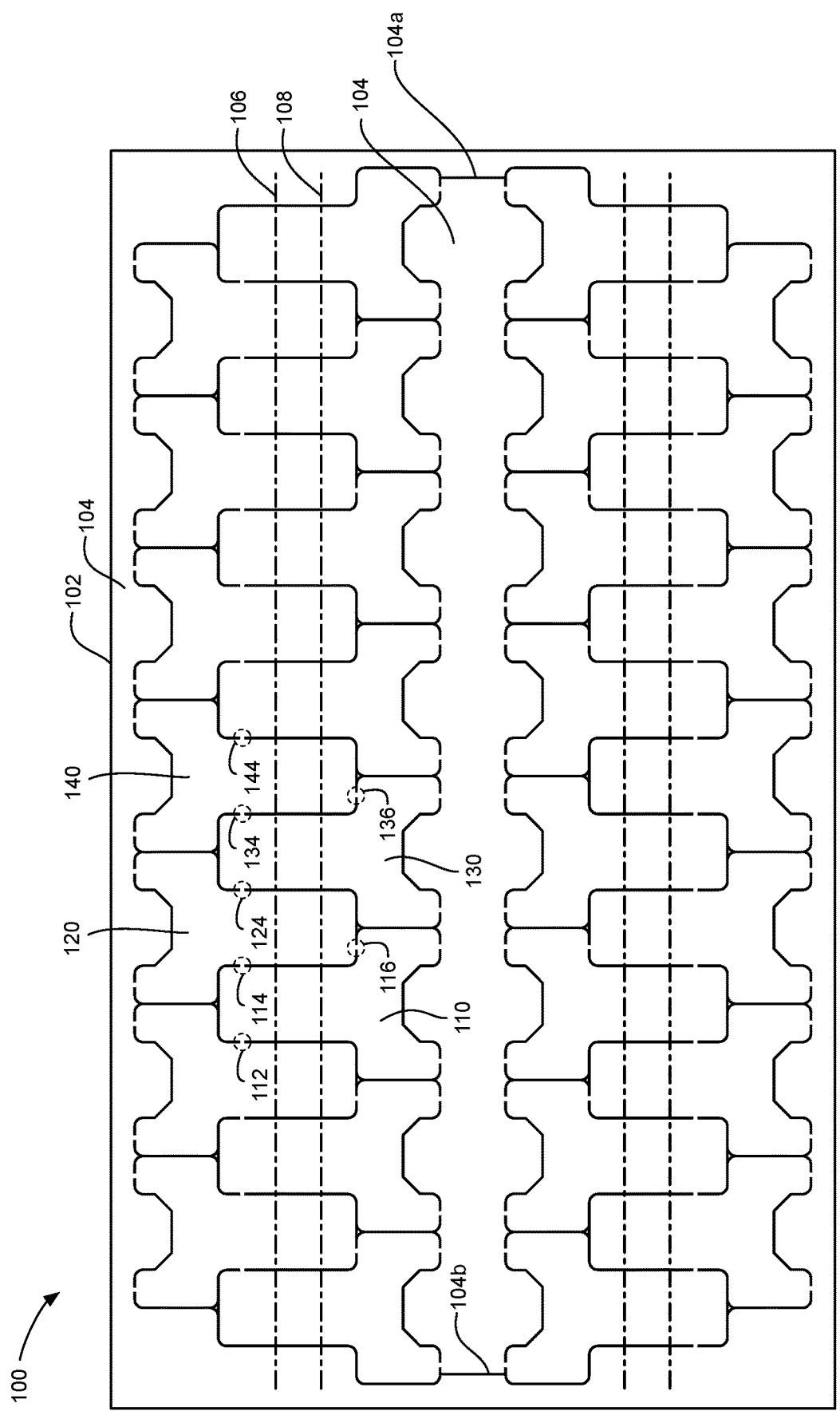
FIG. 1 is a top plan view of an exemplary nested workpiece layout.

There will now be described by way of example, several specific modes of the invention as contemplated by the inventor. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description of the invention.

Overview

Embodiments of the present invention provide for systems and processes that significantly improve the efficiency in the manufacture of three-dimensional component parts formed from a flat sheet of material. As described above, workpieces may be substantially formed from a sheet of material, yet still held rigidly to the sheet of material or adjacent workpieces by way of one or more joints or "microjoints." The present invention addresses the use of a nested component part layout or pattern that simultaneously accomplishes multiple objectives, such as (i) reducing the amount of waste material, (ii) increasing the number of component parts produced per bending operation, and (iii) providing for microjoints that have both sufficient strength to withstanding bending operations and sufficient weakness to be broken expeditiously—without the aid of substantial machinery or tools, or repeated steps or operations.

An example nested component layout method involves arranging the unbent workpieces in a substantially nested, tessellating, or otherwise aligned arrangement. For the purposes of the present disclosure, a workpiece is "placed" or "arranged" onto a sheet of material by designating cut paths that, when followed by a cutting machine or the like, separates or substantially separates a portion of the sheet of material that constitutes an unbent workpiece. An arrangement may be considered "aligned," insofar as the bend lines along which a fold is to be formed extends continuously across the length or width of a sheet, and is "coherent"—where the direction and angle of the bend across entire bend line is the same. Such an aligned arrangement of workpieces allows a press brake or bending machine to impart multiple folds into multiple respective workpieces simultaneously, through a single bending operation (e.g., one press of a punch against a die, one motion of a bending arm of a bending machine, etc.).

The example nested component layout method also involves the selection, designation, or placement of "microjoints" along the cut paths, which rigidly hold in place the unbent workpieces to allow the sheet to be subjected to one or more bending operations, thereby forming bends or folds into the workpieces. In various embodiments, the microjoint placement may adhere to one or more rules or conditions that enables the microjoints to withstand the bending press operations, while also permitting the microjoints to be broken apart after bending, without the assistance substantial machinery or tools (e.g., by hand).

Each microjoint may be associated with a particular axis of rotation, indicating the degree of freedom about which the microjoint is most easily rotated (e.g., the axis of rotation about which the moment of inertia is smallest, given any material obstructions or other microjoint constraints). Further, the size and strength of any particular microjoint may vary as a function of the balancing of its rigidity to maintain the integrity of the sheet of material versus the desired strength for the facilitated detachment from a row or grid of shaped piece parts. For example, two square workpieces, may be affixed to each other, with one on the left and another on the right, connected along adjacent edges by one microjoint. In this example, there are three possible rotational degrees of freedom about the microjoint for the right square with respect to the left square: (a) tilting the right square clockwise or counterclockwise, or "yaw"; (b) folding the right square onto the left square, or "roll"; and (c) twisting the right square such that the adjacent edges of the two squares remain parallel to each other, or "pitch." The yaw direction is the most constricted axis of rotation, because the corners of the right square press against the edge of the left square. The roll direction is a comparatively less constricted axis of rotation, because—while the thickness of the left and right squares will abut—the microjoint could be weakened and/or broken through repeated rolling in opposite directions. The pitch direction, in contrast, is the least constricted axis of rotation, as no material of the left square comes in contact with that of the right square. At most, the pitch direction experiences a torsion resistance due to the strength of the microjoint itself.

Given the potential restrictions to a microjoint's rotational degrees of freedom, some microjoints discussed herein may be referred to as having a "rotational axis" or "rotational degree of freedom"—the rotational axis about which the microjoint experiences the least amount of resistance to rotational motion. In the two-square example above, the microjoint's rotational axis is the "pitch" axis, as twisting would require less force than tilting or folding.

Embodiments of the present disclosure take advantage of the realization that two or more microjoints in a nested component layout may be aligned, such that they share a common rotational axis. Although each workpiece may be rigidly coupled to other workpieces and/or a sacrificial portion of the sheet metal (e.g., via multiple microjoints)—such that an individual workpiece could not easily be removed from a sheet of bent workpieces—a first subset of the bent workpieces may be readily separated from a second subset of the bent workpieces without substantial force—by rotating the first or second subset of bent workpieces about the rotational axis extending through two or more microjoints that couple the first and second subsets of bent workpieces together. In this manner, a plurality of bent workpieces may be simultaneously freed along a series of aligned microjoints, thereby eliminating that constraint on any individual bent workpiece's rotational degrees of freedom.

In principle, stable structures can be created by restricting an element's rotational degrees of freedom. The microjoint placement techniques described herein leverage this stability for the purpose of introducing bends into substantially cut workpieces in sheet metal or other material, while simultaneously exploiting the weakness of the collective pattern by arranging a set of microjoints to have a shared axis of rotation. By simultaneously breaking this first set of microjoints that share an axis of rotation, the bent workpieces are freed from the constraint of those microjoints, and can then be rotated in axes orthogonal to that initial axis of rotation. In other words, breaking the initial set of microjoints subsequently enables the facilitated breaking of microjoints between individual piece parts, without the need for substantial force or machinery.

The present disclosure contemplates the extension of this concept into methods for both microjoint placement, as well as processes for forming and separating bent workpieces. For instance, microjoints may be arranged such that a first subset of them are broken in an initial operation, a second subset of them are broken in the second operation, a third subset of them are broken in a third operation, and so on. At each separation stage, a respective subset of microjoints may be relatively unconstrained in their respective axes of rotation (aligned or otherwise), allowing them to be individually "twisted" and broken off from the pattern or array, without substantial force. Significantly, this technique departs from previously known microjoint arrangements, which do not resolve the issue of strong microjoint structures that are often difficult to separate, without the aid of machinery or tools.

Embodiments of the present disclosure also provide rules, conditions, and/or other criteria that enable highly efficient nested layout designs involving two or more bends, and to evaluate the strength or weakness of particular microjoint arrangements. These rules, conditions, and/or criteria are described in more detail below.

As described herein, a "workpiece" may refer to an individual component, piece-part, part, bracket, or other element, where a number of workpieces (plus some amount of sacrificial material) collectively form a sheet of material, such as sheet metal. A workpiece may be substantially formed from sheet metal, but may still be rigidly coupled to adjacent workpieces and/or to another portion of the sheet of material (such as sacrificial material). Furthermore, a workpiece may be unbent or bent. The term "component part" or "piece part" may also be used herein interchangeably with the term "workpiece."

As described herein, "nesting" may refer to a process by which two or more workpieces are arranged on a sheet of material, such that they are immediately adjacent to each other laterally. In some cases, nested workpieces share a common boundary (e.g., "line merging"), whereby a single cut path forms a portion of the edges of two or more workpieces simultaneously. Some "nesting" processes may involve orienting workpieces in a layout that minimizes or otherwise reduces the amount of waste material (e.g., the portion(s) of the sheet metal that do not form a workpiece), which needs to be discarded.

As described herein, a "microjoint" may refer to a bridge of material—produced from gaps in cut paths, soldering, brazing, welding, by overlaid adhesive or otherwise—that rigidly couples two or more portions of a sheet of material together. For example, a microjoint may rigidly couple one workpiece to another workpiece. As another example, a microjoint may rigidly couple a workpiece to a sacrificial portion of the sheet of material. Although the term "microjoint" is used throughout, the bridge or joint may or may not be on the scale of micrometers—in other words, the use of prefix "micro" in this disclosure is not intended in any way to limit the sizes or dimensions of the joints covered by the scope of this disclosure.

As described herein, a "bend line" may refer to a virtual line extending across a sheet of material, along which a bending operation is to be performed. For CNC bending machines, a "bend line" may be specified as coordinates embedded within control instructions for the machine. In some instances, the term "bend line" also encompasses properties relating to the bend to be formed, such as its direction (e.g., convex or concave from a reference perspective), angle, and/or shape (e.g., hard crease, rounded bend, etc.), which may be imparted through CNC control or through the use of a specific punch or bending arm.

As described herein, bend line "coherence" may refer to a single bend line, which extends across multiple workpieces for forming multiple bends simultaneously, having homogenous properties (e.g., the same direction, angle, and shape), such that multiple bends can be imparted into multiple affixed workpieces through a single bending operation.

As described herein, a "bending operation" refers to a single stroke of a press brake's punch, a discrete movement or set of movements for forming a bend in a CNC bending machine, and/or any other force that is administered over multiple, affixed piece parts for a desired duration, and to a desired degree—and then stopped. For example, in a press brake having a four foot-long die and a corresponding four foot-long punch, a bending operation could form a single fold into a single workpiece placed in the die, or form multiple folds in multiple workpieces placed in the die—both for the same amount of time (e.g., the time involved in a single press brake stroke).

Figure 5:
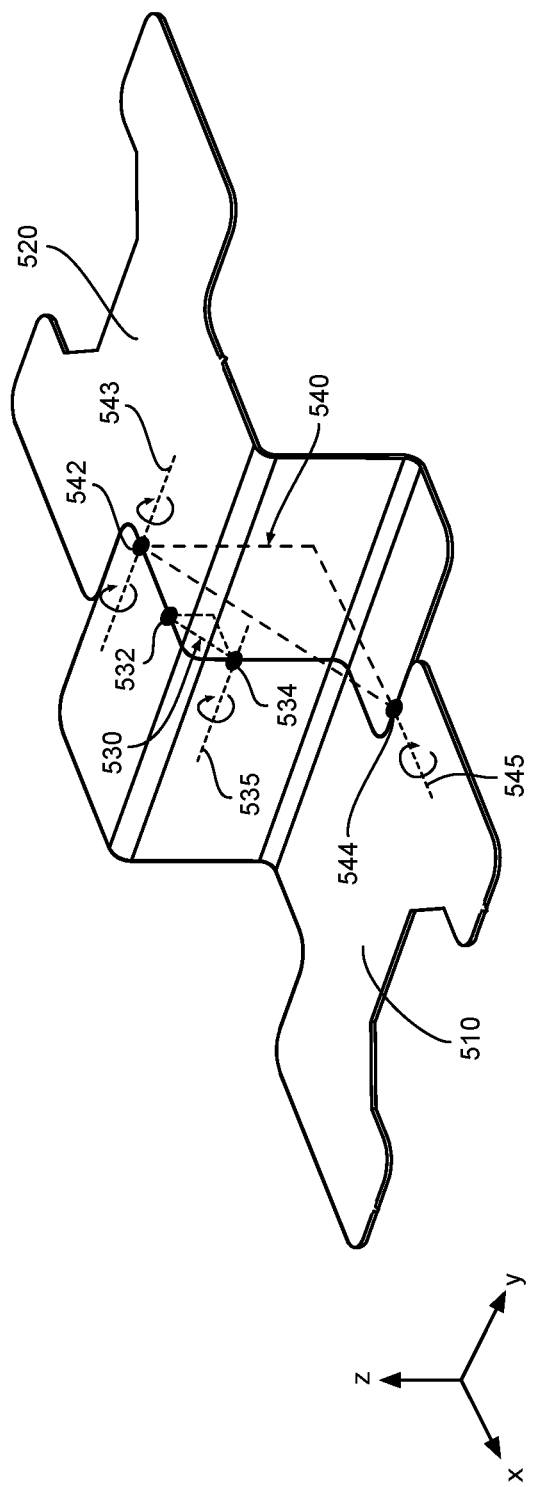
FIG. 5 is a perspective view of two bent workpieces, from the aligned piece part embodiment of FIG. 1, illustrating another approach to microjoint placement.
Figure 6:
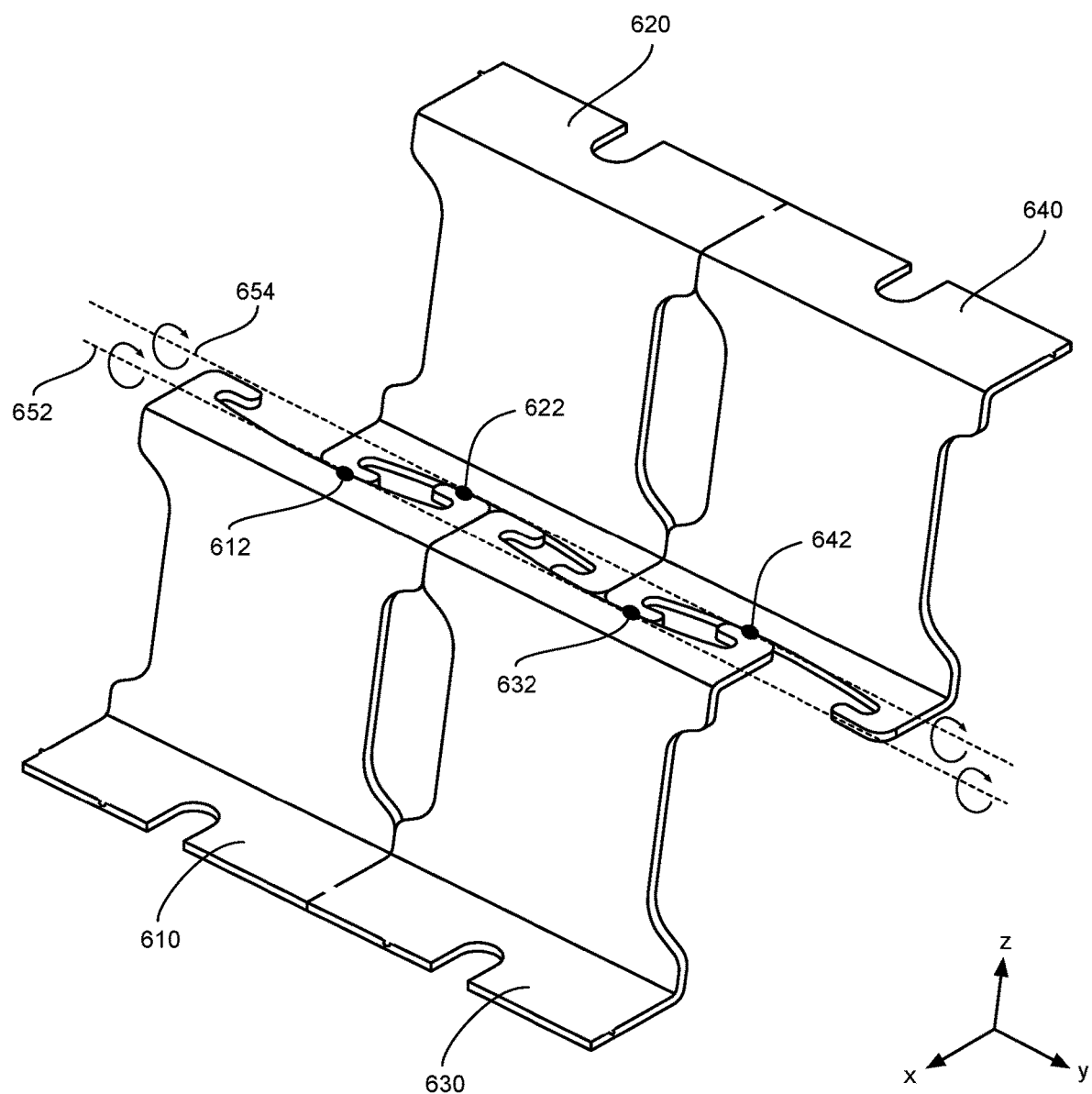
FIG. 6 is a perspective view of four bent workpieces, from the aligned piece part embodiment of FIG. 3, illustrating another example approach to microjoint placement.

The following disclosure—as shown and described with respect to FIGS. 1, 2A-2E, 3, and 4—details two specific examples of nested component layouts and microjoint placements. Similarly, the following disclosure, as shown and described with respect to FIGS. 5-6, provides examples as to the alternative potential placement of microjoints. These examples are provided for exemplification only, and are not intended to limit the present disclosure in any way. The nested component layout techniques and microjoint placement techniques of the present disclosure can be broadly applied to a variety of other workpiece designs, without departing from the scope of the present application.

First Example of Nested Workpiece Layout and Detachment Process

FIG. 1 is a top plan view of example nested workpiece layout 100. In this example, a plurality of Y-shaped workpieces, including workpieces 110, 120, 130, and 140, are arranged within on sheet 102 of material, such as metal. The workpieces utilize a significant portion of sheet 102, with sacrificial (waste) portion 104 being positioned between and/or about the workpieces. Nested workpiece layout 100 also includes contemplated bend lines, such as bend lines 106 and 108, which extend across the entirety of sheet 102.

In operation, a cutting machine forms cuts along the paths according to layout 100. As shown in FIG. 1, a number of gaps in the cut paths exist, some of which are highlighted using dashed-line circles 112, 114, 116, 124, 134, 136 and 144. These gaps in the cut paths leave a portion of connecting material of sheet 102, or "microjoints," between a workpiece and an adjacent workpiece or sacrificial portion 104. The microjoints may vary in size and dimension, depending on the strength of the material of sheet 102, the amount of force to be withstood in forming bends during the subsequent steps in the manufacturing process, and other possible factors. The microjoints shown in the figures of the present application are not necessarily drawn to scale, and may be intentionally exaggerated for explanatory purposes.

After a cutting machine, laser, or the like performs each of the "cuts," the workpieces are substantially formed within sheet 102. However, due to the remaining microjoint connections 112, 114, 116, 124, 134, 136 and 144, the entire sheet and the workpieces substantially formed therein can be collectively moved, manipulated, and even subject to some forces without separating the workpieces entirely from sheet 102. Thus, the workpieces remain in a state of substantially rigid coupling with respect to the other workpieces in sheet 102. This substantial rigid co-planar coupling enables, in part, sheet 102 to be deformed by a press brake or bending machine—including the formation of bends across multiple workpieces according to the bend lines such as bend lines 106, 108—all without causing any separation of the workpieces from their rigidly coupled state.

Included among the workpieces formed in the example according to FIG. 1 are workpieces 110, 120, 130, and 140. Workpieces 110, 120, 130, and 140 all have substantially the same shape. However, workpieces 110 and 130 have an orientation opposite to that of workpieces 120 and 140. The shape of workpieces 110-140 allow for an efficient nesting arrangement by way of the above-described line merging. For example, a cut path for workpiece 120 also simultaneously forms a portion of the edges of workpieces 110, 130, and 140. Such an arrangement significantly reduces the amount of waste material that would otherwise constitute sacrificial material portion 104, while also reducing an amount of time involved in cutting out the workpieces of sheet 102.

Workpiece 110 is rigidly coupled to an adjacent workpiece by microjoint 112, is rigidly coupled to workpiece 120 by microjoints 114 and 116, and is also rigidly coupled to sacrificial portion 104 extending along the longitudinal center of sheet 102. Likewise, workpiece 120 is rigidly coupled to workpiece 130 by way of microjoint 124, and also has microjoint connections with sacrificial portion 104 extending along the top of sheet 102. Similar to workpiece 110, workpiece 130 has two microjoint connections with workpiece 140—microjoints 134 and 136, and also includes microjoint connections with the longitudinal central part of sacrificial portion 104. Workpiece 140 is rigidly coupled on its right to an adjacent workpiece at microjoint 144, as well as to the top region of sacrificial portion 104.

Some microjoint connections between workpieces 110-140 and sacrificial portion 104 are in a substantially linear and co-planar alignment. This microjoint placement allows workpieces 110, 130, and the their horizontally-aligned workpieces in sheet 102 to be broken off from the central region of sacrificial portion 104 by "folding" away the central region of sacrificial portion 104. In this example, the central region of sacrificial portion 104 becomes completely detached from other areas of sacrificial portion 104 after cutting, by way of the two cut lines (104a and 104b) shown in FIG. 1 extending across the workpieces at opposite ends of sheet 102. Likewise, the microjoints between workpieces 120, 140, and their horizontally-aligned workpieces in sheet 102 are co-planar (even after bending operations form bends along bend lines 106, 108) and linearly aligned, and can therefore be broken off simultaneously in a similar fashion, by "folding" away the top region of sacrificial portion 104 from the workpieces.

The breaking of microjoints may be achieved without substantial force (e.g., by hand), and the breaking of two or more microjoints simultaneously may be achieved in the same manner in certain conditions where the microjoints are linearly aligned and in the same plane—in other words, when and where the microjoints share a common axis of rotation. Embodiments of the present disclosure leverage this common rotational axis to form workpieces that are rigidly coupled and able to withstand the forces of bending operations (or other post-cutting operations), while also allowing the structure to be broken down through the application of a more specific, targeted force or torque and/or in accordance with a disassembly procedure. For example, a nested workpiece layout may be designed such that a targeted force breaks one or more microjoints in the structure, thereby reducing the number of rotational constraints needed to separate one or more respective workpieces, from its aligned workpieces. Then, some or all of the microjoints remaining on the one or more respective workpieces can be broken by applying a force or torque that previously would have been insufficient to break those microjoints (as the now partially-broken structure is comparatively weaker than the structure with all microjoints intact).

Thus, the disassembly of a microjointed set of bent workpieces may be performed as a series of steps, each step involving the separation of the least rotationally constrained microjoints, thereby freeing entire groups of initially rotationally-constrained microjoints to be rotated about a now unconstrained (or less constrained) degree of freedom. The now rotationally-unconstrained (or less constrained) microjoints can be broken, in turn freeing even more previously rotationally-constrained microjoints to be rotated about their now unconstrained (or less constrained) degrees of freedom. In this manner, the intentional application of a series of targeted forces or torques—taking advantage of particular rotational weaknesses of a specific set of microjoints at each stage of the disassembly process—can enable an entire set of bent workpieces held together by many microjoints to be separated from each other quickly and easily, without substantial machinery or heavy tools. In practice, an operator may be trained for, or otherwise possess knowledge of, a particular detachment process associated with a respective nested workpiece layout. The specific procedure, forces or torques, and steps employed in a detachment procedure may vary among different workpiece layouts.

Figure 2A:
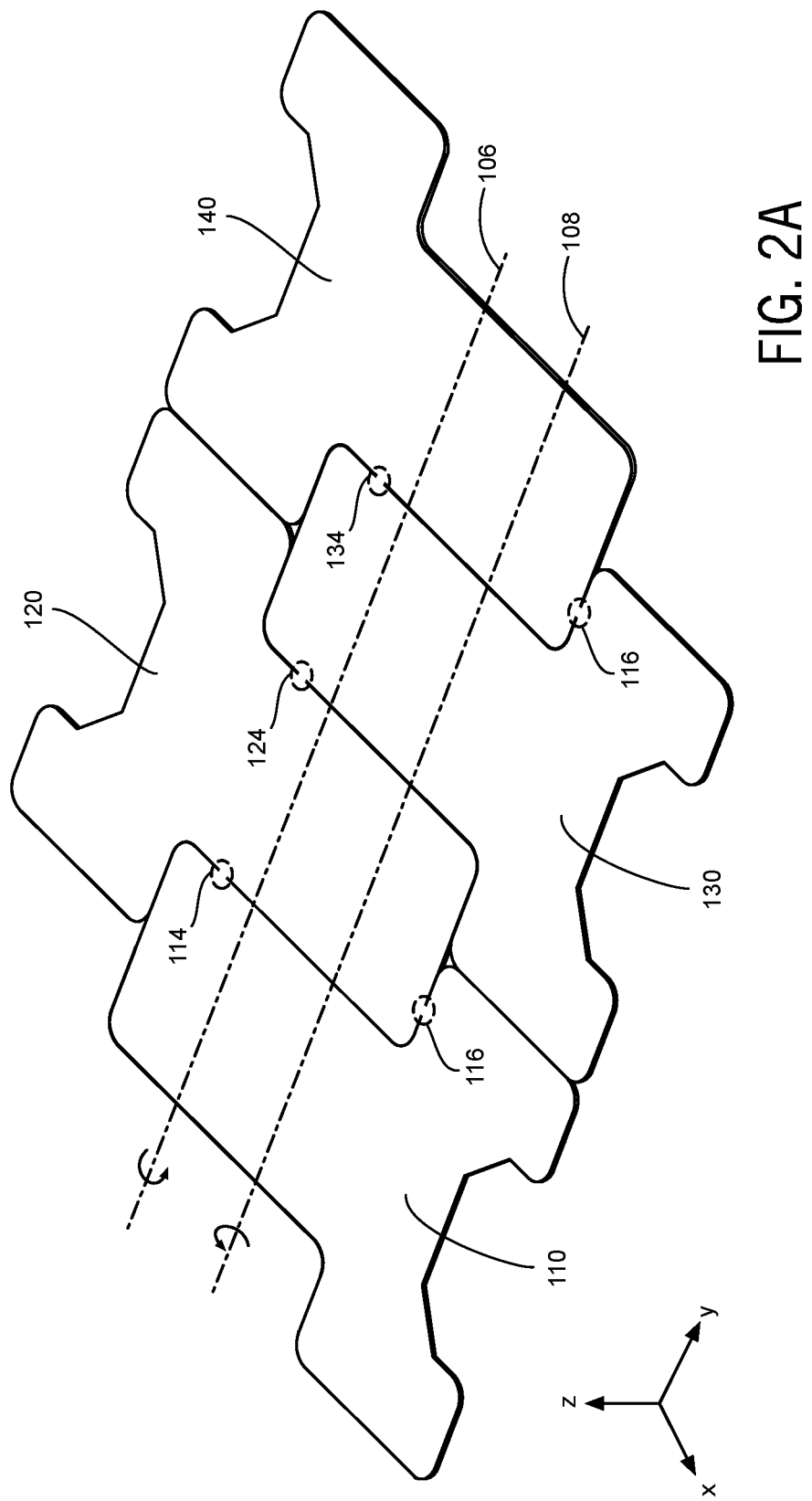
FIG. 2A is a perspective view of four unbent workpieces, according to the embodiment of FIG. 1.

FIGS. 2A-2D illustrate various stages in an example manufacturing process in which bends are formed in workpieces 110-140, and workpieces 110-140 are separated from each other according to an example disassembly procedure. Although workpieces 110-140 are shown separately from the other workpieces shown in FIG. 1, the formation, bending, and separating of those workpieces may each be done to any number of workpieces, preferably when those workpieces are part of a larger sheet of material as shown in FIG. 1, depending upon the particular implementation, shape, and size of the workpieces, and the capabilities of a cutting machine and/or bending machine. The four workpieces 110-140 are shown in FIG. 2A as already separated from the other workpieces from FIG. 1 for explanatory purposes here, relative to the example disassembly procedure.

In the following description of FIGS. 2A-2D, the axes are defined as follows: rotation about the x-axis may be referred to a "roll"; rotation about the y-axis may be referred to a "pitch"; and rotation about the z-axis may be referred to as "yaw." The positive z-direction may be referred to as "upward," while the negative z-direction may be referred to as "downward."

Figure 2B:
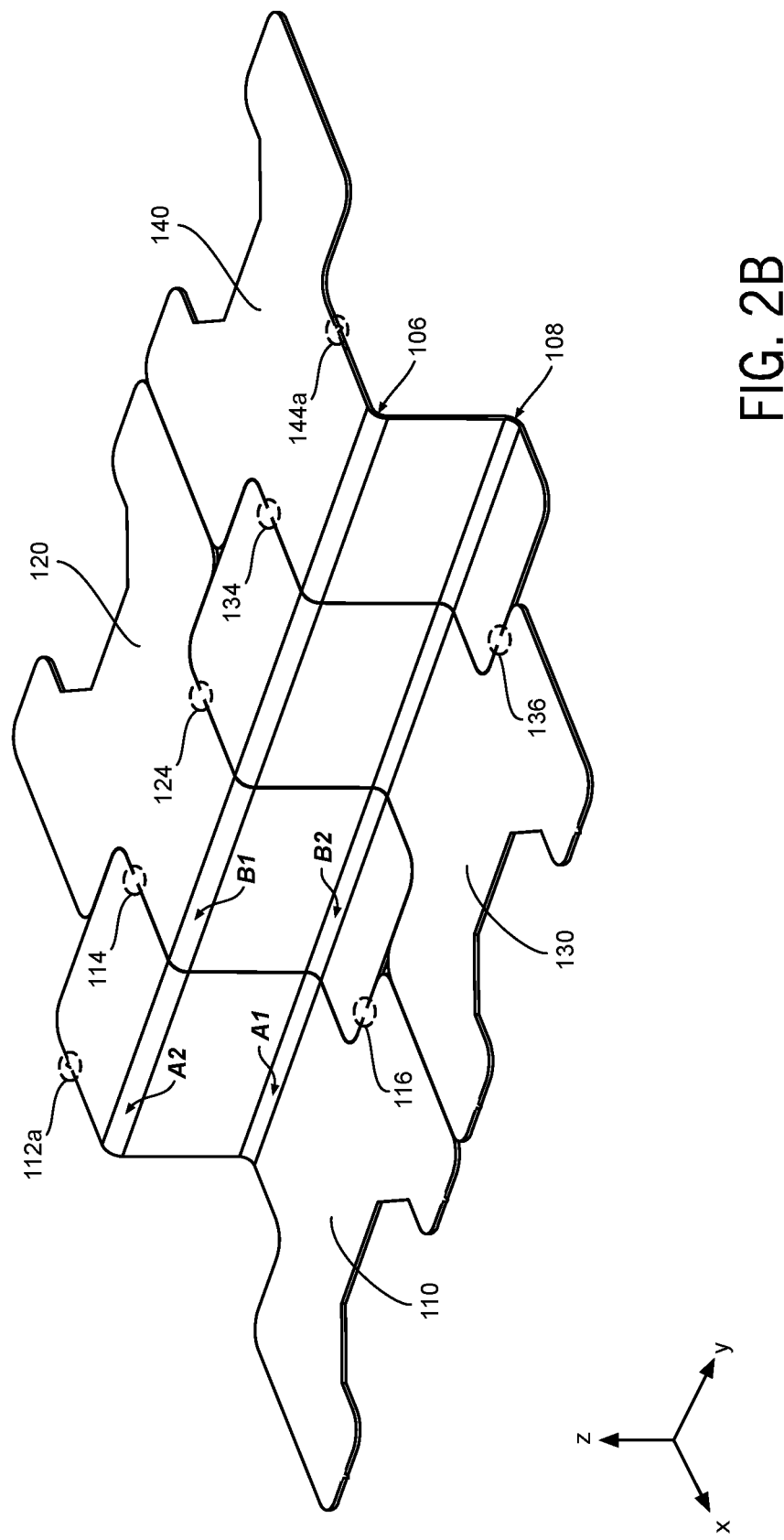
FIG. 2B is a perspective view of four bent workpieces, according to the embodiment of FIGS. 1 and 2A.

In FIGS. 2A-2D, unbent workpieces 110-140 are shown initially to be flat in the x-y plane. In a subsequent bending operations, a bending machine or press brake forms bends into workpieces 110-140 according to bend lines 106, 108. Specifically, bend line 106 involves bending a central portion extending between bend lines 106, 108 downwardly by approximately 90 degrees (hereinafter the "convex" bend or fold). Additionally, bend line 108 involves bending a lower portion extending in the positive x-direction from bend line 108 upwardly by approximately 90 degrees (hereinafter the "concave" bend or fold). As a result, as shown in FIG. 2B, the plane of the lower portion and the plane of an upper portion extending in the negative x-direction from bend line 106 are substantially parallel, with the result that both of those planes are once again flat in the x-y plane, whereas the plane of the central portion in between bend lines 106, 108 is orthogonal to that of the upper and lower portions—and is flat in the z-y plane.

Figure 2C:
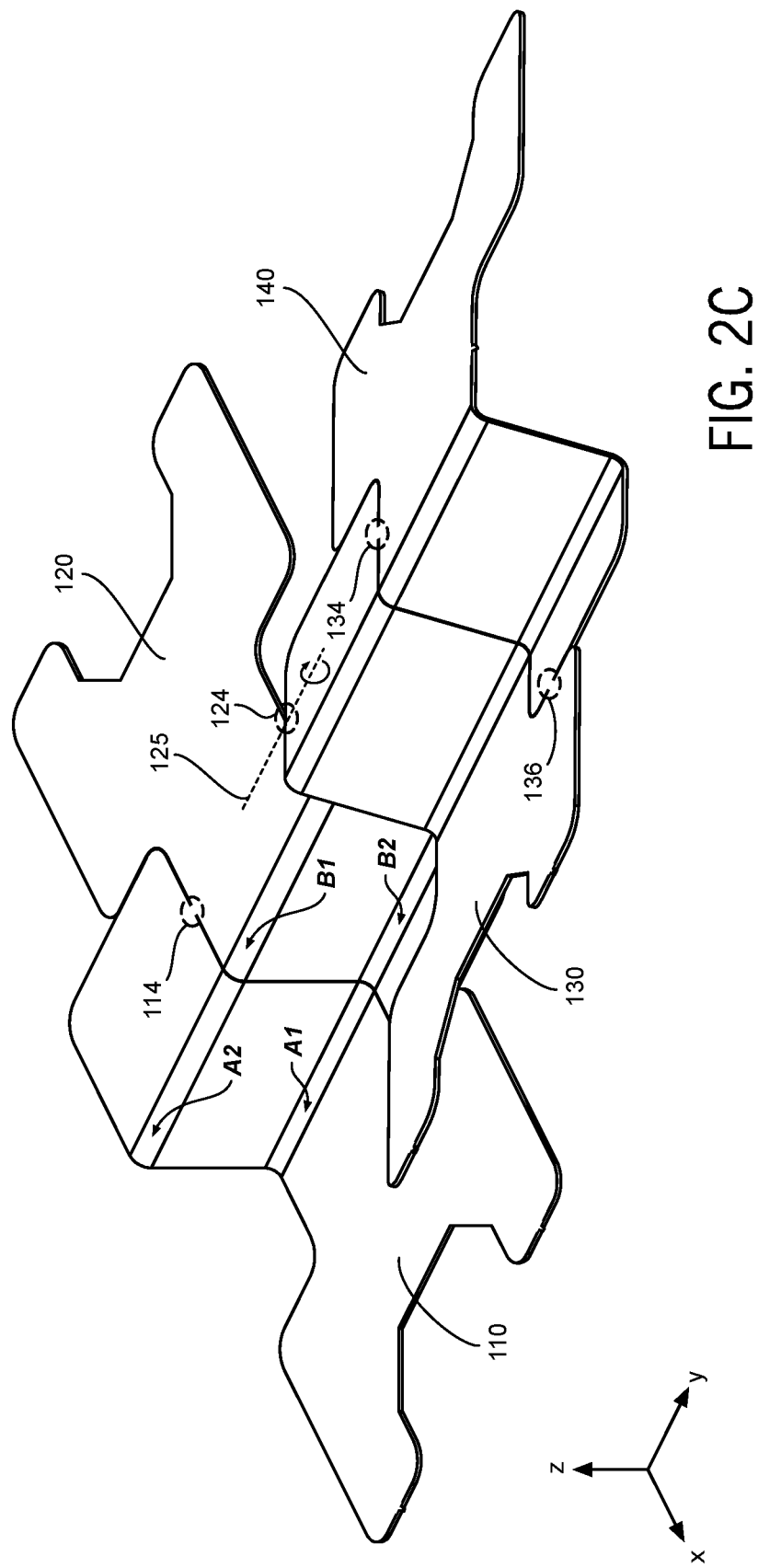
FIG. 2C is a perspective view illustrating a first stage in separating the four bent workpieces, according to the embodiment of FIGS. 1, 2A, and 2B.
Figure 2D:
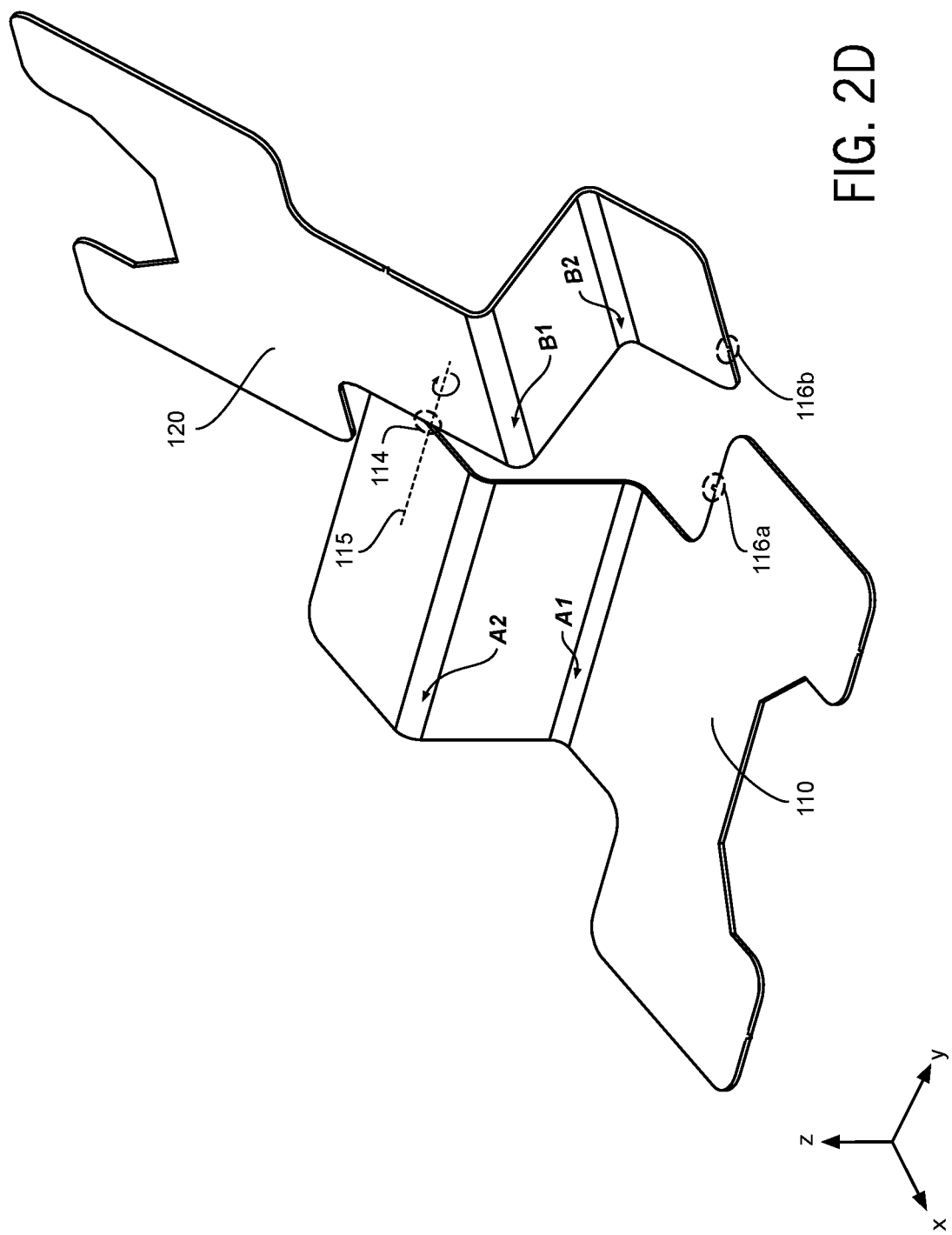
FIG. 2D is a perspective view illustrating a second stage in separating two of the four bent workpieces, according to the embodiment of FIG. 2C.
Figure 2E:
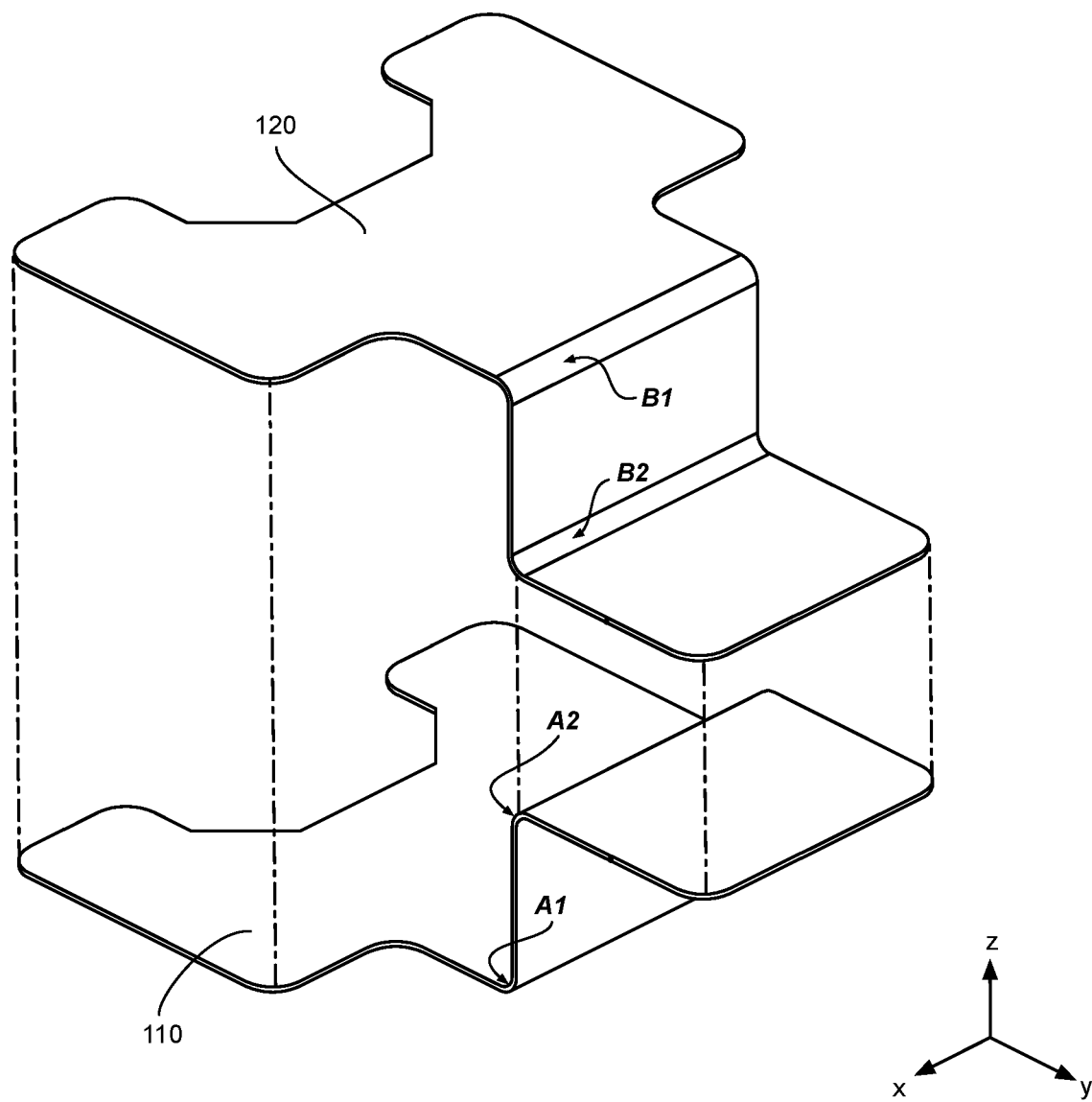
FIG. 2E is a perspective view illustrating the reflectional symmetry of the bent workpieces of FIG. 2D.

As described above, workpieces 110 and 130 are (effectively) oppositely oriented (i.e., rotated about the z-axis by approximately 180 degrees) with collective respect to workpieces 120 and 140. Significantly, the alternating (or "interlaced") orientation of workpieces 110-140 result in bend line 106 forming a substantially continuous convex bend across all of the workpieces 110-140. Likewise, bend line 108 forms a substantially continuous concave bend across all of the workpieces 110-140. Although the orientation of workpieces 110-140 are not the same, the resulting bent workpieces 110-140 are effectively the same shape. This is in part due to each of the workpieces 110 and 130 being "reflectionally symmetric" with workpieces 120 and 140. In other words, flipping workpieces 110 and 130 across the x-y plane of symmetry makes workpieces 110 and 130 substantially identical to workpieces 120 and 140. This property of reflection symmetry of workpieces 110 and 120 is illustrated in FIG. 2E.

Thus, despite coherent bend lines forming bends at different positions in different workpieces, all of the resulting bent workpieces may functionally be the same. Whereas previous attempts at forming multiple bent workpieces in a reduced number of bending operations (i.e., fewer than the number of discrete bends in each part multiplied by the number of parts to be formed) involved aligning a number of the same workpiece all in the same orientation—such that each bending operation creates the same respective bend in each workpiece—the techniques of the present disclosure are capable of forming the same bent workpiece with each bending operation creating a different bend in a different location of a given workpiece. In one example, a workpiece may be designed to exhibit reflection symmetry, allowing the unbent workpiece to be arranged in a more compacted nested layout, while simultaneously enjoying the benefit of forming bends in many workpieces, using only one or a few bending operations.

FIG. 2B shows workpieces 110-140 after a bending procedure has been completed, in which a convex bend was formed in workpieces 110-140 along bend line 106 and a concave bend was formed in workpieces 110-140 along bend line 108. For the example according to FIGS. 2A-2E, the convex bend forms bend A2 in workpiece 110 and bend B1 in workpiece 120. Likewise, the concave bend forms bend A1 in workpiece 110 and bend B2 in workpiece 120. Bends A1 and B1 are numbered "1," while bends A2 and B2 are numbered "2," to illustrate that bends with a common number are the same in both workpieces 110 and 120. In this example, bends A1 and B1 are corresponding bends, although they are formed in different bending operations. Likewise, bends A2 and B2 are corresponding bends, although they too are formed in different bending operations.

With the workpieces in their bent form, several features of the microjoint placement technique itself can be observed. First, microjoints 114, 124, and 134 (together with microjoint remainders 112a and 144a) are co-planar, linearly aligned, and share a common axis of rotation (the y-axis, or "pitch" rotation). In particular, microjoint 124 is relatively unconstrained—at least at this point in the disassembly process—in the "pitch" direction compared to that of microjoints 114 and 134. After the bending operation is performed, but before the stage of the disassembly process shown in FIG. 2B, workpieces 110-140 still remain attached to sacrificial portion 104 of sheet 102. In this example, workpiece 130 was attached to a central region of sacrificial portion 104 by way of microjoints—the remainders of which are shown in FIG. 2B as small burrs or stubs. Note that these "remainders" or burrs shown in the figures may be exaggerated in size and shape, and are provided merely to indicate locations at which microjoints have been broken.

Before workpiece 130 is separated from sacrificial portion 104, its motion is constrained by five microjoints: two microjoints between workpiece 130 and sacrificial portion 104, and microjoints 124, 134, and 136, amongst the aligned piece part. Microjoints 134 and 136 constrain rotational motion between workpiece 130 and 140. However, only microjoint 124 directly couples workpiece to workpiece 120, while only microjoints 134 and 136 join piece part 130 to piece part 140. Indeed, only three joints maintain the position of any one piece part relative to any other aligned and attached piece part. Thus, absent any additional constraints, workpiece 130 is able to "pitch" forward or backward (i.e., rotate about the y-axis) with respect to workpiece 120. While workpiece 130 and workpiece 110 are attached via microjoints to the central region of sacrificial portion 104, workpiece 130 is effectively prevented from pitch rotation, because workpiece 110 is itself unable to pitch, due to the constraint caused by microjoints 114 and 116. Thus, prior to the initial step in the disassembly process of separating the sacrificial portion 104 from the workpieces 110-140, workpieces 110-140 are structurally rigid and capable of withstanding forces experienced from bending machines or press brakes without causing the microjoints to prematurely fail and break.

At the stage in the detachment process shown in FIG. 2B, microjoint 124 is the least rotationally-constrained microjoint, and it comprises a singular microjoint used to connect two small subsets of workpieces (i.e., one subset being workpieces 110 and 120, and the other subset being workpieces 130 and 140) to thereby form a large subset of workpieces. Twisting or pitching the second subset of workpieces, specifically by twisting or pitching workpiece 130 (with workpiece 140 still rigidly coupled thereto) about microjoint 124 can therefore be performed without substantial force or machinery. FIG. 2C illustrates workpieces 130 and 140 (the second subset of workpieces) pitched forward relative to workpieces 110 and 120 (the first set of workpieces), about axis of rotation 125 of microjoint 124. Such pitching forward may be performed by hand, or might be carried out by an automated process. Regardless, FIG. 2C shows that, with workpieces 110 and 130 separated from sacrificial portion 104, workpiece 130 becomes capable of rotating about axis of rotation 125 without substantial difficulty. The act of twisting or pitching workpiece 130 about microjoint 124 causes microjoint 124 to weaken, greatly reducing the force needed to break microjoint 124 thereafter.

With workpieces 110 and 120 separated from workpieces 130 and 140, the next stage in the detachment process is to separate each of the smaller subsets of workpieces, i.e., to separate workpiece 110 from workpiece 120, and to separate workpiece 130 from workpiece 140. FIG. 2D illustrates an example process of separating workpiece 110 from workpiece 120, which may be similarly applied to workpieces 130 and 140. In this example, axis of rotation 115 of microjoint 114 is positioned about the y-axis, similar to that of microjoint 124. However, two potential axes of rotation for microjoint 116 exist: either about the x-axis (a "twist" about microjoint 116, or about the y-axis (a "fold" pitching upward or downward). X-axis "twisting" of workpiece 120 is comparatively easier in the clockwise direction from the perspective shown in FIG. 2D than in the counter-clockwise direction, as portions of workpiece 120 abut against portions of workpiece 110 when rotated in the counter-clockwise about the x-axis. Y-axis pitching, on the other hand, may be more difficult, as "folding" is less effective at weakening microjoint 116 than twisting is. However, rotation about the y-axis at microjoint 116 does not cause the intersection of respective portions of workpieces 110 and 120.

In another example, microjoint 114 is associated with an axis of rotation that is about the x-axis, in which the side of workpiece 120 opposite microjoint 114 is moved upwardly (in the positive z-direction) and "folded in" toward workpiece 110 (in the negative y-direction). Applying a force or torque to effect the rotation of workpiece 120 about the x-axis with respect to microjoint 114 in turn produces a shear force at microjoint 116 (in the positive y-direction and positive z-direction). In some implementations, microjoint 116 may be substantially weak enough to break when subjected to such a shear force. This rotation about the x-axis extending through microjoint 114 is substantially constrained until workpiece 120 itself has been separated from workpiece 130. To the extent that microjoint 116 breaks more easily from the above-described y-directional shear force, as opposed to a downward negative z-directional force, then the breaking of microjoint 124 serves to reduce a rotational constraint on workpiece 120 with respect to microjoint 114. Either of the two above detachment techniques may be applied.

One example detachment process may involve "rocking" or folding along an axis extending through microjoints 114 and 116. Such rocking may weaken microjoint 114 and/or 116, enabling one or both of them to be broken without substantial force. However, in another example embodiment, microjoint 116 may be made comparatively weaker (e.g., smaller in size, partially cut, etc.) than microjoint 114, such that applying downward, negative z-directional force against workpiece 120 at or near microjoint 116 may cause it to break apart without twisting or other rotational weakening.

Regardless of the particular way in which microjoint 116 is broken, the example shown in FIG. 2D illustrates that, once microjoint 116 has been broken (with microjoint remainders 116a and 116b left on workpieces 110 and 120, respectively), workpiece 120 is free to pitch forward or backward about axis of rotation 114 of microjoint 114. Like with microjoint 124, twisting workpiece 120 about the y-axis weakens microjoint 114, allowing it to be broken without the need for substantial force. This process is repeated for each pair of bent workpieces held together by the respective microjoints corresponding to microjoints 114 and 116.

The detachment process shown and described with respect to FIGS. 2A-2D is just one example way in which the workpieces 110-140 could be separated from each other. Other microjoint separation techniques may also be used without departing from the scope of the present disclosure. The particular example provided in relation to FIGS. 2A-2D illustrate that, by using the workpiece layout and microjoint placement techniques disclosed herein, it is possible to form many bent workpieces in a highly efficient manner, and to separate large subsets of workpieces into smaller subsets of workpieces, and then to separate those small subsets of workpieces into individual workpieces without the need for heavy machinery—and even, in many cases, by a glove-protected hand.

FIG. 2E depicts workpieces 110 and 120 arranged to illustrate their reflectional symmetry. Relative to the positions and orientations of workpieces 110 and 120 in FIG. 2B, workpiece 120 has been rotated approximately 180 degrees about the z-axis and positioned directly over and above workpiece 110. In vertical alignment, the reflectional symmetry can be immediately observed. In particular, the symmetry shows that bends A1 and B1 are the same, despite being formed from different bend lines. Likewise, bends A2 and B2 are the same, although they were formed from different bend lines. This symmetry can be further understood by flipping workpiece 120 about the x-y plane by 180 degrees, to reveal that workpiece 120 is substantially identical to workpiece 110 in that orientation.

Thus, embodiments of the present disclosure involve providing a nested workpiece layout of workpieces that, once bent into a three-dimensional shape, exhibit reflection symmetry. Each workpiece in the layout is oppositely oriented (rotated about the z-axis) with respect to its adjacent workpieces. Although a coherent bend line may form bends in workpieces that seem to be in an incorrect direction, the resulting bent workpieces may be substantially the same by virtue of the workpieces' reflection symmetry. This realization may be advantageously used to produce bent components with a single bend, or even more complicated bent components with more than two bends, depending on the particular component.

Second Example of Nested Workpiece Layout and Detachment Process

Figure 3:
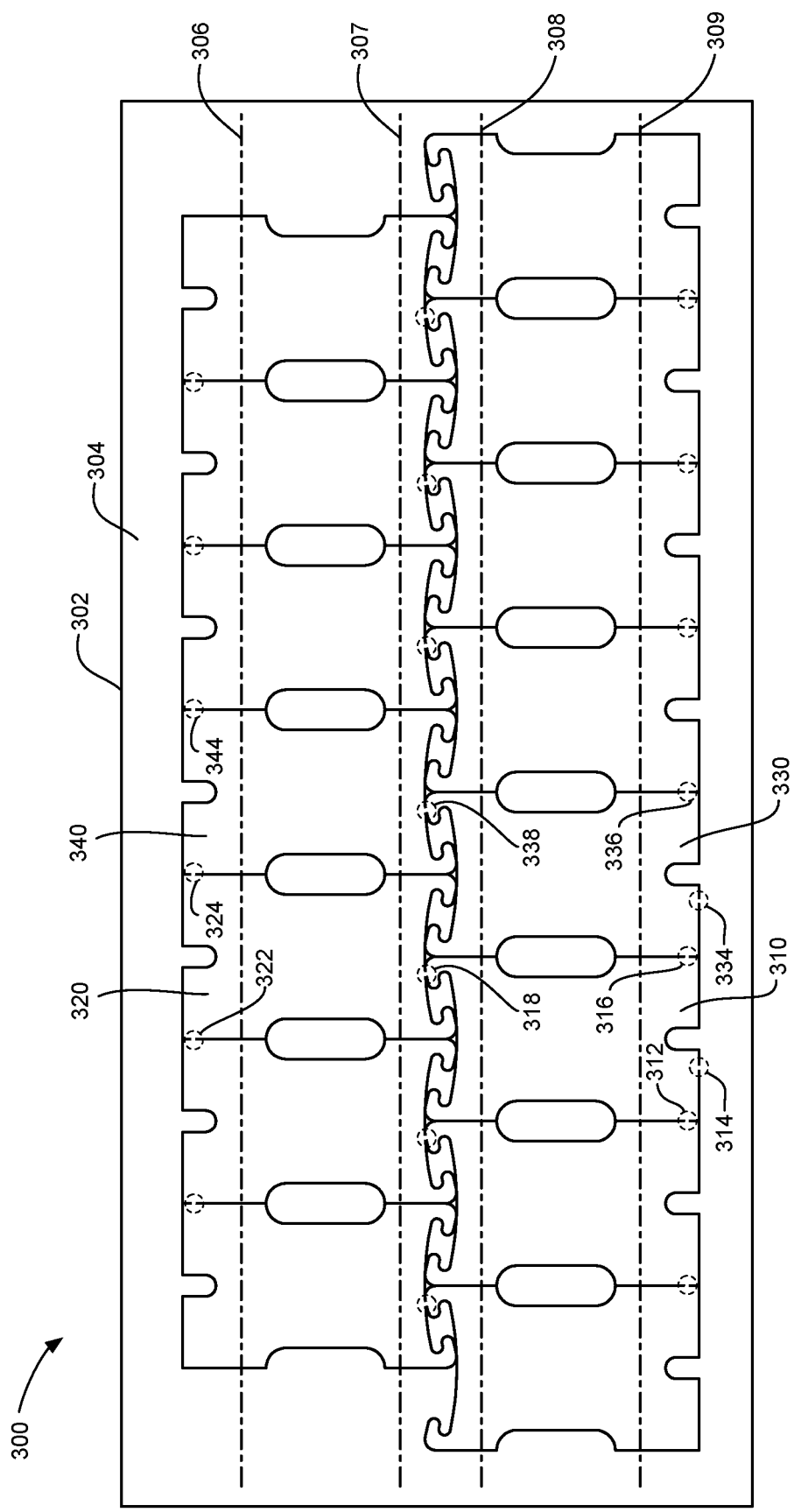
FIG. 3 is a top plan view of another example of nested workpiece layout.

FIG. 3 depicts a top plan view of example nested workpiece layout 300. Like the example shown and described with respect to FIG. 1, workpiece layout 300 includes a set of workpieces—including workpieces 310, 320, 330, and 340—arranged within sheet 302 of material, such as metal. Here, the workpieces utilize a significant portion of sheet 302, with sacrificial portion 304 being positioned within and around sheet 302. Nested workpiece layout 300 also includes bend lines 306, 307, 308, and 309—all of which extend across the entirety of sheet 302.

Included among the workpieces formed within sheet 302 are workpieces 310, 320, 330, and 340, all of which have substantially the same shape. Like the previous example, some degree of line merging is achieved in workpiece layout 300. For instance, workpiece 330 shares common cut paths with workpiece 310, 320, and 340. Moreover, a portion of workpiece 330 is laterally nested "within" sections of workpiece 320 and 340, as can be observed in FIG. 3.

Workpiece 310 has a number of microjoint connections, including microjoint 312 with an adjacent workpiece, microjoint 314 with sacrificial portion 304, microjoint 316 with workpiece 330, and microjoint 318 with workpiece 320. Workpiece 320 also has a few microjoint connections, including microjoint 322 with an adjacent workpiece, and microjoint 324 with workpiece 340. Workpiece 330 also is connected to sacrificial portion 304 by way of microjoint 334, an adjacent workpiece by way of microjoint 336, and workpiece 340 by way of microjoint 338. Workpiece 340, in addition to the above-described microjoint connections, is rigidly coupled to an adjacent workpiece through microjoint 344.

Although particular microjoints are shown in FIG. 3 and specifically discussed herein, additional microjoints may be included, such as microjoints connecting edges of workpieces to sacrificial portion 304 of sheet 302.

Figure 4:
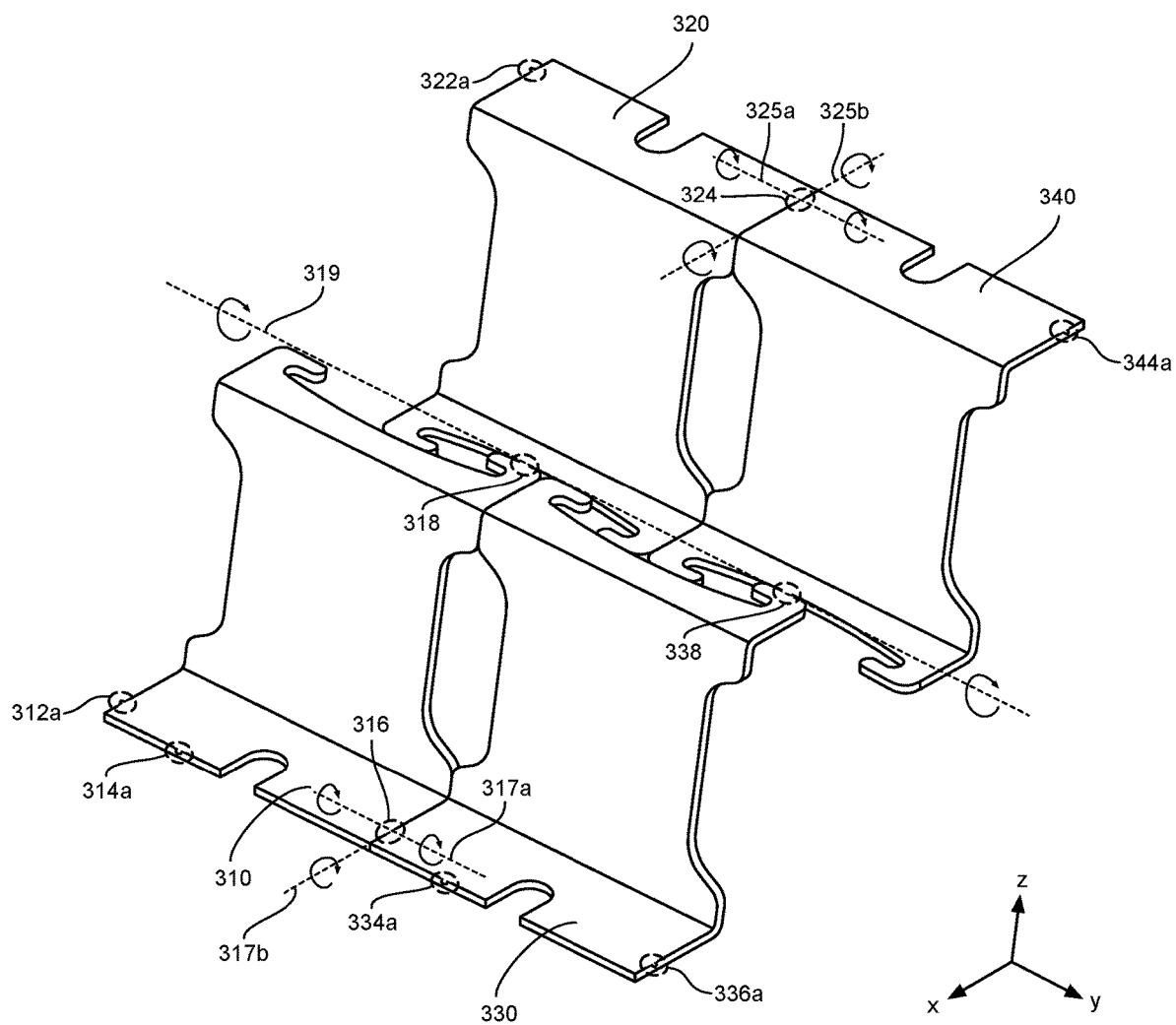
FIG. 4 is a perspective view of four bent workpieces, according to the example embodiment of FIG. 3.

FIG. 4 illustrates four workpieces 310, 320, 330, and 340, after being substantially cut from sheet 302 and bent by a bending machine or press brake along bend lines 306-309. In this example, some microjoints are initially rotationally constrained and therefore difficult to break, such as microjoint 316 that couples workpiece 310 to workpiece 330, as well as microjoint 324 that couples workpiece 320 to workpiece 340. Workpiece 330 could be rotated with respect to microjoint 316 about axis of rotation 317a (rotation about the y-axis) or about axis of rotation 317b (rotation about the x-axis)—neither of which can be easily performed, due in part to the constraint of microjoint 338 on workpiece 330. Likewise, workpiece 340 could be rotated with respect to microjoint 324 about axis of rotation 325a (rotation about the y-axis) or about axis of rotation 325b (rotation about the x-axis)—neither of which can be easily performed, also due in part to the constraint of microjoint 338 on workpiece 340. Thus, if released from the constraint of microjoint 338, both workpiece 330 and workpiece 340 could more freely rotate about the possible rotational axes described above.

The example layout design shown in FIGS. 3 and 4 specifically take advantage of the above realization by first enabling the large subset of workpieces 310, 320, 330, 340 to be broken apart into two smaller subsets of workpieces, namely, collective workpieces 310 and 320 on the one hand, and collective workpieces 330 and 340, on the other. Whereas the large subset of workpieces in FIGS. 2A-2D were broken apart into smaller subsets via a single microjoint 124 (as shown in FIG. 2C), the workpieces 310, 320, 330, 340 require more than one microjoint to provide sufficient stability for the bending process described above. Even though more than one microjoint may be required for certain workpiece shapes, styles and/or arrangements, the techniques of the present disclosure have shown that it would still be possible to break apart the large subset of workpieces into two smaller subsets (one subset being 310 and 320, and the other subset being workpieces 330 and 340) without the need for significant force or heavy machinery— and, in some cases, by hand, by providing a set of linearly-aligned microjoints with a common axis of rotation. In this case, axis of rotation 319 extends through both microjoints 318, 338, both of which are linearly-aligned along that same axis. Only four workpieces are shown in FIG. 4 for explanatory purposes, with microjoint remains 312a, 322a, 336a, and 344a being illustrated to show that workpieces 310-340 have been separated from other adjacent workpieces. In this particular alignment, rotating workpieces 320, 340 about axis of rotation 319 causes microjoints 318, 338 to weaken, and eventually break, thereby separating the large subset of the four workpieces shown in FIG. 4 into two smaller subsets, where workpieces 320, 340 would thus be separated from workpieces 310, 330. Once microjoints 318, 338 are severed, a rotational constraint on workpiece 340 is removed, allowing workpiece 340 to be pitched or rolled about microjoint 324 to weaken and break microjoint 324. Similarly, with a rotational constraint on workpiece 330 removed, workpiece 330 can be pitched or rolled about microjoint 316 to weaken and break microjoint 316.

In some cases, workpieces 310-340 may include microjoint connections with sacrificial portion 304 of sheet 302. In this example, microjoints 314 and 334 had rigidly coupled workpieces 310 and 330, respectively, to sacrificial portion 304 of sheet 302. A similar set of microjoints may be provided between workpieces 320, 340 and sacrificial portion 304 of sheet 302. Each of these sets of microjoints are—like microjoints 318 and 338—linearly aligned and share a common axis of rotation. Thus, similar "folding" operations can be performed to simultaneously weaken and break the respective set of aligned microjoints. In this example, microjoint remains 314a and 334a are shown, indicating that workpieces 310 and 330, respectively, were previously coupled to sacrificial portion 304 and removed therefrom prior to the stage shown in FIG. 4 of the disassembly process.

Thus, at least a portion of the detachment process can be described as follows. At the outset, one would break the sets of linearly-aligned microjoints sharing a common axis of rotation along their respective axes of rotation, in order to break the large subset of workpieces 310, 320, 330, 340 into two smaller subsets of workpieces, namely, workpieces 310 and 330, and workpieces 320 and 340. In this example, these joints include: microjoints 314, 334, and other microjoints connecting workpieces in horizontal alignment with workpieces 310, 330 to sacrificial portion 304, if present; microjoints connecting workpieces 320, 340, and other horizontally-aligned workpieces with sacrificial portion 304, if present; and microjoints 318, 338, and other microjoints in linear alignment. The alignment of each of these sets of microjoints permits them to be rotated evenly, and in alignment, about the y-axis, and therefore "folded" or twisted, to weaken and break the joints without substantial machinery. With these sets of microjoints broken, other microjoints, such as microjoints 316 and 324, become less rotationally constrained.

Then, the detachment process involves breaking the microjoints rigidly coupling each of the two smaller subsets of workpieces, by folding or twisting about the x-axis or y-axis, respectively. This step may be repeated for each bent workpiece formed from sheet 302, until of the all workpieces have been separated from each other.

This detachment process shares some similarities with that of the example shown and described with respect to FIGS. 1 and 2A-2D. Both processes involve beginning with a large subset of rigidly-coupled workpieces, initially applying a force or a torque to a first smaller subset of rigidly-coupled workpieces against a second smaller subset of rigidly coupled workpieces, about one or more microjoints that have an effectively unconstrained degree of freedom (in the sense that no other microjoints impede their rotation about a particular axis of rotation). This step of breaking the large subset into two smaller subsets serves to remove an initial constraint on one or more rotational degrees of freedom for one or more of the individual workpieces. Then, with the initial microjoint or set of microjoints broken, the smaller subsets of workpieces are twisted, pitched, rolled, or otherwise rotated about one or more newly freed-up axes of rotation about one or more remaining microjoints—to allow each individual workpiece to be broken off from within its smaller subset. In this manner, workpieces potentially held in place by three or more microjoints (five microjoints in some examples of the present disclosure) can be detached, in many implementations, by hand.

Although the examples of the present disclosure describe breaking apart microjoints "by hand," the term is intended by the applicant to refer to the ability to sever microjoint connections with a force or torque below some threshold amount of force or torque. While human strength varies from person to person, some microjoint structures comprised of three or more metal microjoints (e.g., galvanized steel) would likely be too difficult to "punch out" by hand, in part due to the strength of the metal and partially due to the combined strength of the microjoint structure. Furthermore, in some instances, the sheet of material may be relatively weak or susceptible to deformation, such that the application of significant force may bend or otherwise deform if breaking the microjoints involved substantial force or torque. Thus, the threshold amount of force or torque may be specified as below a threshold, above which deformation of the material (or other forms of damage) is possible or likely.

Moreover, the term "by hand" and similar terminology used herein includes the use of tools, or even automated or computer-controlled machines, to separate the workpieces. For instance, the disassembly processes described above may be carried out by automated machines, such as articulated arms, specialized tools or machines, and/or other non-human means.

The following section elaborates on aspects of the microjoint placement methods of the present application.

Microjoints on Different Planes

FIG. 5 is a perspective view of workpieces 510 and 520 showing two possible microjoint placement methods. Microjoints 542 and 544 are similarly located as microjoints 134 and 136, respectively, of FIG. 2B. The pair of microjoints 542, 544 are located on different planes, and form a "virtual triangle" 540. As described herein, a "virtual triangle" refers to a structure formed between two microjoints on different planes. Like a truss, a virtual triangle can be used to assess the structural integrity or strength of the structure formed between two non-coplanar microjoints.

Microjoints 532 and 534 are shown as alternative microjoint locations for microjoints 542 and 544, respectively. Notably, microjoint 534 is located on the vertical y-z plane of the structure comprised of workpieces 510 and 520. Microjoints 532, 534 form virtual triangle 530, which is comparatively smaller than virtual triangle 540.

As a general principle, larger virtual triangles create stronger, more stable structures. Thus, in some situations, microjoints 542, 544 forming virtual triangle 540 would create a stronger structure compared to microjoints 532, 534 forming virtual triangle 530.

However, in addition to taking into consideration the size of the virtual triangle, the axes of rotation about the microjoints also affects the rotational degrees of freedom between workpiece 510 and workpiece 520. In this example, axis of rotation 543 of microjoint 542 is in the y-direction. However, axis of rotation 545 of microjoint 544 is in the x-direction. This dissimilarity between axes of rotation 543, 545 imposes less of a constraint on the rotational degrees of freedom of microjoints 542, 544 than if axis of rotation 545 were also in the y-direction. With axes of rotation that are not "parallel" (e.g., in the same direction but on different planes), workpiece 510 and workpiece 520 can be "folded" along virtual triangle 540, weakening both microjoints 542, 544.

In contrast, axis of rotation 535 of microjoint 534 is in the y-direction—the same axis of rotation as microjoint 532 (also a y-directional rotation axis; not shown). Having parallel axes of rotation on different planes creates a substantially stronger structure, despite virtual triangle 530 being smaller than virtual triangle 540.

Thus, in determining microjoint locations when microjoints are on different planes, a preferred placement for two microjoints are the locations in which the size of the virtual triangle is largest with the axes of rotations for the two microjoints being orthogonal (or not parallel). These rules or conditions may be employed by a layout designer, or may be computationally determined using an algorithm, optimization function, or some other automated means. Likewise, the size and strength of an individual joint can be adjusted.

Microjoints on the Same Plane

FIG. 6 is a perspective view of workpieces 610, 620, 630, and 640—which are similar to workpieces 310, 320, 330, and 340, respectively, of FIG. 3—showing an example of microjoint placement. In this example, four co-planar microjoints are provided: microjoints 612 and 622 extending between workpieces 610 and 620; and microjoints 632 and 642 extending between workpieces 630 and 640. Microjoints 612 and 632 share a common axis of rotation 652 (in the y-direction), while microjoints 622 and 642 share a different axis of rotation 654 (also in the y-direction). Although axes of rotation 652 and 654 are in parallel, they are not the same axis.

In the example shown in FIG. 6, microjoints 612, 622, 632, and 642 form effectively triangular structures—all within the same x-y plane. As a result, workpieces 620 and 640 are restricted from pitching forward, as microjoints 612 and 632 restrain rotation about the y-axis along axis of rotation 654 extending through microjoints 622 and 642. Likewise, workpieces 620 and 640 are also restricted from pitching forward, due to microjoints 622 and 642 restraining rotation about the y-axis along the axis of rotation 652 extending through microjoints 612, 632. The structural integrity of the combined microjoint structure rigidly coupling workpieces 610, 620, 630, and 640 is therefore significantly stronger than the example shown and described with respect to FIG. 4, where there are only two microjoints 318 and 338. The strength of the microjoint structure shown in FIG. 6 may be particularly difficult to break apart without the application of significant force or the aid of heavy machinery.

Given this realization, microjoint arrangements on the same plane should be placed according to one of two methods. In one example method, all microjoints on a given plane that rigidly couple together a set of workpieces should all share a common axis of rotation—particularly when the breaking of that set of microjoints frees up other microjoints to be rotated about their respective axes of rotation. In another example method, two or more sets of microjoints may be arranged on the same plane, provided that those two sets of microjoints (i) include one set of microjoints that are co-linear, co-planar, and share a common axis of rotation, and (ii) include another set of microjoints whose respective axes of rotation are orthogonal (or at least not parallel) to the common axis of rotation of the other set of microjoints.

Figure 7:
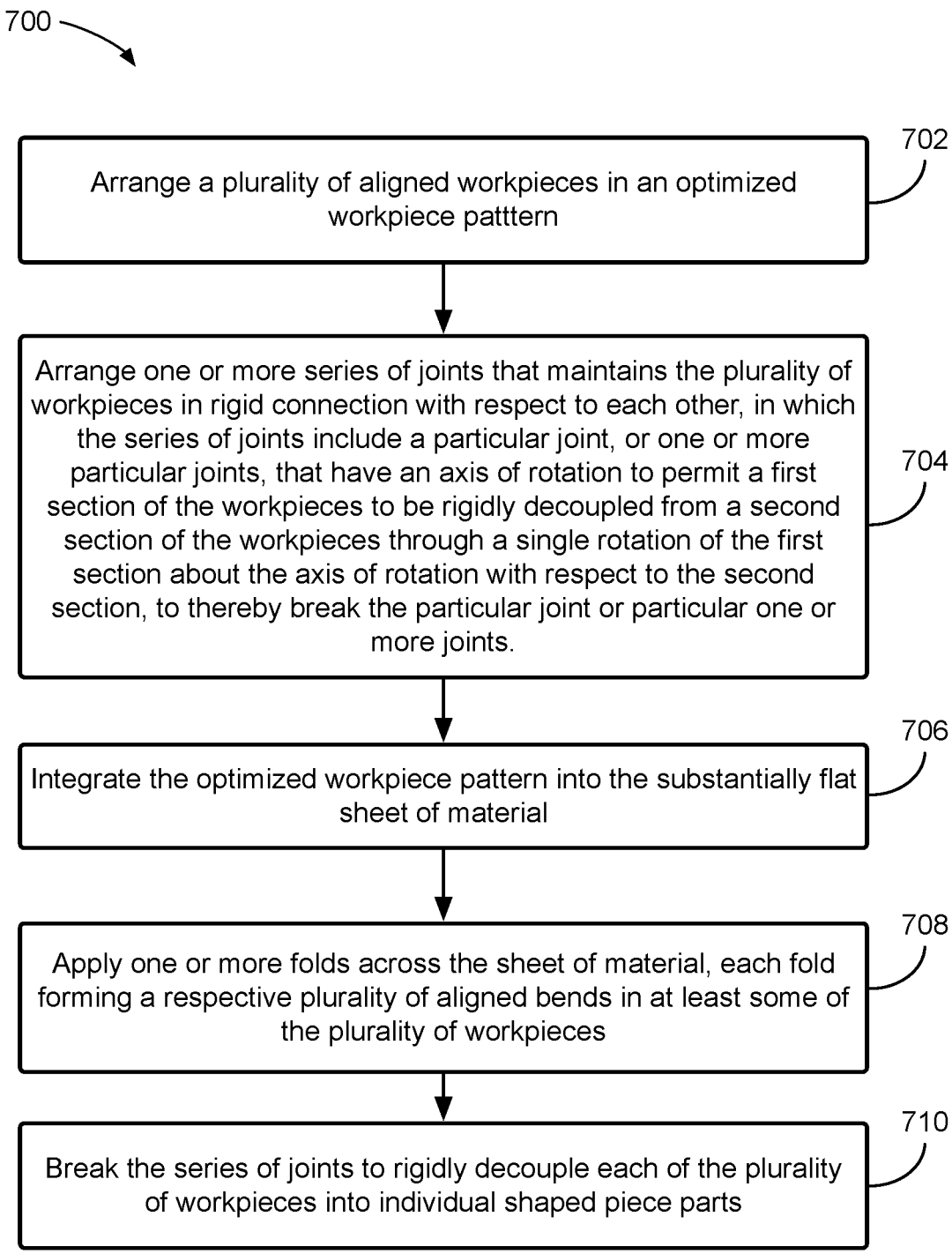
FIG. 7 is a flowchart of an example shaped piece part formation process.

FIG. 7 is a flowchart of an example shaped piece part formation process 700. One or more aspects of process 700 may be performed manually, or in an automated fashion (e.g., using an algorithm or other computer-aided design, using computer-controlled machines that cut, bend, join, or otherwise perform some aspect of process 700, etc.). In addition, one or more aspects of process 700 may be performed by entities that comprise the systems described herein. Furthermore, process 700 may include fewer or additional steps than are explicitly shown and described with respect to FIG. 7.

Process 700, at step 702, involves arranging a plurality of aligned workpieces in an optimized workpiece pattern. The optimized workpiece pattern may be similar to layout 100 described above with respect to FIG. 1, layout 300 described about with respect to FIG. 3, and/or any other layout that applies the nesting and joint placement techniques described or contemplated in the present disclosure.

Process 700, at step 704, involves arranging one or more series of joints that maintains the plurality of workpieces in rigid connection with respect to each other. The series of joints may include a particular joint, or one or more particular joints, that have an axis of rotation which enables a first section of the workpieces to be rigidly decoupled from a second section of the workpieces through a single rotation of the first section about the axis of rotation with respect to the second section, to thereby break apart the particular joint or particular one or more joints. For example, with respect to FIG. 2C, the particular joint may be microjoint 124 having axis of rotation 125, which enables the first section of workpieces 110 and 120 to be rotated relative to the second section of workpieces 130 and 140. As another example, with respect to FIG. 4, the one or more particular joints may be the linearly aligned set of microjoints that include microjoints 318 and 338, which enables the first section of workpieces 320 and 340 to be rotated relative to the second section of workpieces 310 and 330. Regardless of the particular embodiment, the particular joint, or particular one or more joints, may be relatively unconstrained compared to other microjoints in the arrangement, such that they can be easily broken. The breaking of the particular microjoint or particular one or more microjoints serves to remove a constraint or constraints on other microjoints, so as to allow those other microjoints to then be more easily broken, and so on.

Process 700, at step 706, involves integrating the optimized workpiece pattern into the substantially flat sheet of material. The integration of the workpiece pattern may involve one or more operations, such as cutting, welding, brazing, applying adhesive, and/or other operations that provides a rigid structure with substantially formed workpieces therein, able to withstand subsequent bending operations without breaking the joints.

Process 700, at step 708, involves applying one or more folds across the sheet of material, in which each fold forms a respective plurality of aligned bends in at least some of the plurality of workpieces. Then, once the folds are applied and the bending process is completed, process 700, at step 710, involves breaking the series of joints to rigidly decouple each of the plurality of workpieces into individual shaped piece parts. The series of joints may be broken simultaneously, or in a series of steps according to a detachment process, as described above.

Although certain example methods and apparatus have been described herein, the scope of coverage of this patent is not limited thereto. On the contrary, this patent covers all methods, apparatus, and articles of manufacture fairly falling within the scope of the appended claims, either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A system for efficiently forming a plurality of shaped piece parts from a sheet of piece part material, the system comprising:
   the sheet of piece part material from which the piece parts can be shaped and cut;
   a pattern for arranging the plurality of piece parts in alignment and in a prearranged orientation onto said sheet of piece part material;
   a series of joints connecting aligned ones of piece parts within said pattern;
   a piece part cutting machine configured to separate a plurality of workpieces from the sheet of material according to said patterns and said series of joints, said piece part cutting machine maintaining the plurality of workpieces in said prearranged pattern orientation and locating said series of joints to rigidly couple each of the plurality of piece parts in succession;
   a bending machine for simultaneously applying a first fold and a second fold, each across a respective set of aligned piece parts, without breaking said series of joints, to thereby form a plurality of shaped piece parts, said plurality of shaped piece parts being rigidly maintained in their prearranged orientation by said series of joints; and
   a detacher for breaking said series of joints to groups and individual ones of said shaped piece parts.

2. The system according to claim 1, in which said pattern includes a first set of piece parts arranged in an interlaced opposite orientation with respect to a second set of piece parts.

3. The system according to claim 2, in which said first fold forms a first plurality of bends in the first set of piece parts, and a second plurality of bends in the second set of piece parts, said second fold forming a second plurality of bends in the first set of piece parts, and a first plurality of bends in the second set of piece parts, wherein the first plurality of bends formed in the first set of piece parts corresponds to the second plurality of bends in the second set of piece parts, and wherein the second plurality of bends formed in the first set of piece parts corresponds to the first plurality of bends in the second set of piece parts.

4. The system according to claim 3, in which each shaped piece part formed by the first set of the plurality of piece parts is reflectionally symmetric with respect to each shaped piece part formed by the second set of the plurality of piece parts.

5. The system according to claim 1, in which each of the plurality of piece parts is asymmetric with respect to itself.

6. The system according to claim 1, in which said piece part cutting machine creates said series of joints that comprise one or more particular joints that have an axis of rotation to permit a first section of the plurality of shaped piece parts to be rigidly decoupled from a second section of the plurality of shaped piece parts through a single aligned rotation of the first section about said axis of rotation with respect to the second section.

7. The system according to claim 6, said detacher being further configured to break said one or more particular joints through the single aligned rotation of a group of piece parts.

8. The system according to claim 1, in which said material is metal.

9. The system according to claim 8, in which said metal comprises at least one of the following: steel, galvanized steel, cold rolled steel, and aluminum.

10. The system according to claim 1, in which said piece part cutting machine separates the plurality of piece parts from the sheet of metal by cutting along paths defined by said prearranged orientation of said pattern, said paths being non-continuous at a series of locations corresponding to positions of said series of joints, such that said piece part cutting machine leaves uncut portions of said sheet of said material as micro joints.

11. The system according to claim 1, in which said piece part cutting machine provides said series of joints by welding.

12. The system according to claim 1, in which said piece part cutting machine provides said series of joints by applying an adhesive.

* * * * *